(12) United States Patent
Chen et al.

(10) Patent No.: US 8,411,059 B2
(45) Date of Patent: Apr. 2, 2013

(54) INTEGRATED ELECTROMAGNETIC TYPE INPUT FLAT PANEL DISPLAY APPARATUS

(75) Inventors: Wei-Chou Chen, Hsin-Chu (TW); Chia-Te Huang, Hsin-Chu (TW)

(73) Assignee: Waltop International Corporation, Hsin-Chu (TW)

(*) Notice: Subject to any disclaimer, the term of this patent is extended or adjusted under 35 U.S.C. 154(b) by 268 days.

(21) Appl. No.: 13/073,777

(22) Filed: Mar. 28, 2011

(65) Prior Publication Data

US 2012/0068984 A1 Mar. 22, 2012

(30) Foreign Application Priority Data

Sep. 21, 2010 (TW) ................................ 99132033 A

(51) Int. Cl.
*G06F 3/041* (2006.01)

(52) U.S. Cl. .......... 345/173; 345/174; 345/97; 345/104; 345/204; 345/211; 345/156; 345/179; 345/88; 345/83; 178/18.01; 178/18.03; 178/18.06; 178/18.07

(58) Field of Classification Search .................. 345/30, 345/37, 50, 55, 83, 84, 87, 88, 94, 97, 104, 345/156, 204, 211, 173–183; 178/18.01, 178/18.03, 18.06, 18.07
See application file for complete search history.

(56) References Cited

U.S. PATENT DOCUMENTS

| | | | |
|---|---|---|---|
| 4,395,736 A * | 7/1983 | Fraleux | 348/303 |
| 2008/0198143 A1* | 8/2008 | Kinoshita et al. | 345/175 |

* cited by examiner

*Primary Examiner* — Lun-Yi Lao
*Assistant Examiner* — Insa Sadio
(74) *Attorney, Agent, or Firm* — Stout, Uxa, Buyan & Mullins, LLP

(57) ABSTRACT

An integrated electromagnetic type input flat panel display apparatus is disclosed. The integrated electromagnetic type input flat panel display apparatus comprises a display panel, a control unit and a signal processing unit. The display panel has a display unit and an electromagnetic sensor unit, wherein the display unit and the electromagnetic sensor unit are integrated in to a substrate of the display panel. The signal processing unit receives and processes the signals from the electromagnetic sensor unit.

18 Claims, 4 Drawing Sheets

INTEGRATED ELECTROMAGNETIC TYPE INPUT FLAT PANEL DISPLAY APPARATUS

CROSS-REFERENCE TO RELATED APPLICATIONS

The entire contents of Taiwan Patent Application No. 099132033, filed on Sep. 21, 2010, from which this application claims priority, are incorporated herein by reference.

BACKGROUND OF THE INVENTION

1. Field of the Invention

The present invention relates to a flat panel display apparatus with input function, and more particularly to an integrated electromagnetic type input flat panel display apparatus.

2. Description of Related Art

Touch panel technologies which Integrate touch control techniques into a display apparatus have been developed as an important and major trend of the display technology. Comparing to the conventional display apparatus with display function only, the display apparatus with a touch panel constitutes the communicating interface between the user and a host. For example, users may input desired information to the host using a touch panel integrated with the display apparatus while watching images displayed by the display apparatus. Allowing users to input desired information to the host via a display surface of the display apparatus, a touch panel substantially reduces or eliminates the need for other types of input devices such as keyboards, mice, and the like. Currently, touch panels have been widely integrated with display surfaces of flat panel display apparatuses such as liquid crystal display (LCD), plasma display panel (PDP), electroluminescence (EL) display, organic light emitting display (OLED), and electronic paper display (EPD), etc.

Depending on the type of contact object used such as a user's finger, a digital pen or a stylus, etc., and depending on the manner in which the location, of a contact point (i.e., the location or the distance where the contact object is operably proximate the touch panel) is determined, touch control technologies are generally classifiable as resistive-type, capacitive-type, electromagnetic-type, and infrared-type touch control technologies.

The advantage of the resistive-type, capacitive-type, and infrared-type touch control technologies is to allow a user to operate and input information with user's fingers. However, for hand writing by using a digital pen or a stylus, there are several problems. When user's hand or palm resting on the touch panel's surface, one major problem for the resistive-type, capacitive-type, and infrared-type touch control technologies is that these three kinds of technologies cannot easily distinguish the stylus between user's palms. Furthermore, the resistive-type and capacitive-type touch modules placed on the display panel such as an LCD panel will reduce the rate of transmission and increase the reflection of light so as to degrade the optical characteristics of the display apparatus.

Electromagnetic-type touch control technique is usually applied in coordinate input apparatuses such as digitizers. The coordinate input apparatus includes sensor coils or antennas arranged along x and y axes constituting a sensor plane and a coordinate indicator such as a stylus with a resonance circuit (without battery) or a self powered digital pen. The coordinates of the indicator are obtained through signal transmitting and receiving between the indicator and the sensor coils. There is a trend of integrating electromagnetic-type input technique into the display apparatus to overcome the problems for hand writing application to distinguish the digital pen or the stylus between user's palm or finger approaching the display surface. Moreover, since the sensor plane is placed under the display panel, the sensor plane will not degrade the optical characteristics of the display apparatus. Therefore, the electromagnetic-type input technique is so far the best hand writing technique to be integrated into the display apparatus. Nevertheless, since the trend of modern flat panel display is to develop light and thin display apparatus, both for large size flat display and small size electronic paper display, placing the sensor plane under the display panel does not meet the requirement of modern flat panel display. Moreover, although placing the sensor plane under the display panel will not degrade the optical characteristics of the display apparatus additional printed circuit board with sensor coils or antennas is needed which increases the weight and cost of the display apparatus. Finally, there are problems of alignment between the display panel and the printed circuit board with sensor coils or antennas or determination of location of the narrow edges of the display apparatus during manufacture.

In order to solve the above-mentioned drawbacks of the conventional flat panel display apparatus with input function, an integrated electromagnetic type input flat panel display apparatus is thus provided.

SUMMARY OF THE INVENTION

An object of the present invention is to provide an integrated electromagnetic type input flat panel display apparatus without additional printed circuit board with sensor coils or antennas to decrease the weight and cost of the display apparatus and to prevent the problems of alignment between the display panel and the printed circuit board with sensor coils or antennas.

According to the object of the present invention, an integrated electromagnetic type input flat panel display apparatus is provided. The integrated electromagnetic type input flat panel display apparatus comprises a display panel and a signal processing unit. The display panel comprises a display unit and an electromagnetic sensor unit. The display unit has a plurality of pixel units, each pixel unit includes a first thin film transistor and a pixel component. A gate terminal of the first thin film transistor connects to a gate line. A source terminal of the first thin film transistor connects to a source line, and a drain terminal of the first thin film transistor connects to the pixel component. The electromagnetic sensor unit includes a plurality of sensor units. Each sensor unit has a second thin film transistor and a sensor coil. A gate terminal of the second thin film transistor connects to the gate line. A source terminal of the second thin film transistor connects to the sensor coil, and a drain terminal of the second thin film transistor connects to a readout line. The signal processing unit receives and processes signals from the electromagnetic sensor unit.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DESCRIPTION OF THE PREFERRED EMBODIMENT

The detailed description of the present invention will be discussed in the following embodiments, which are not intended to limit the scope of the present invention, and can be adapted for other applications. While drawings are illustrated in detail, it is appreciated that the scale of each component may not be expressly exactly.

Figure 1A:
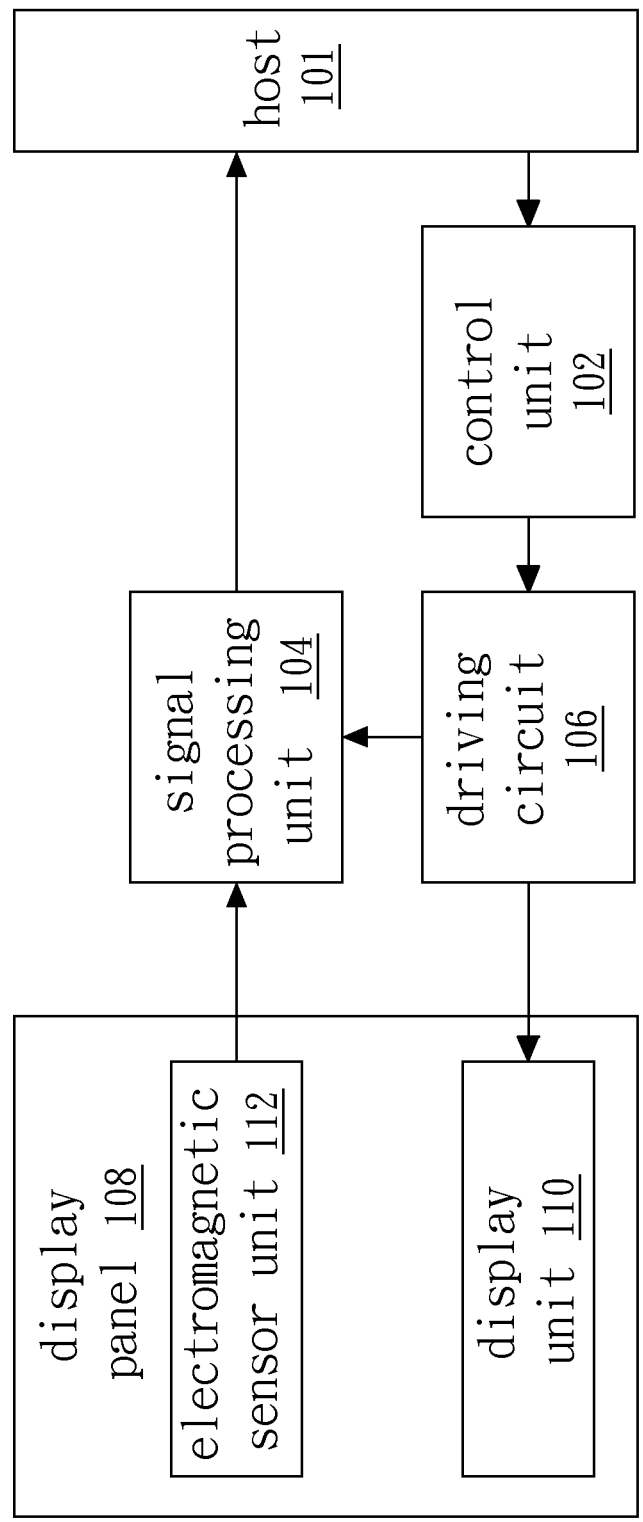
FIG. 1A shows a block diagram of an integrated electromagnetic type input flat panel display apparatus according to one embodiment of the present invention.

FIG. 1A shows a block diagram of an integrated electromagnetic type input flat panel display apparatus according to one embodiment of the present invention. The integrated electromagnetic type input flat panel display apparatus comprises a control unit 102, a signal processing unit 104, a driving circuit 106, and a display panel 108. The display panel 108 comprises a display unit 110 and an electromagnetic sensor unit 112 including sensor coils. The integrated electromagnetic type input flat panel display apparatus can be used with an indicator such as an electromagnetic pen or an electromagnetic stylus. When the indicator approaches the display panel 108, the indicator and the sensor coils of the electromagnetic sensor unit 112 interact with each other through signal transmitting and receiving. The signals received by the electromagnetic sensor unit 112 are processed by the signal processing unit 104 and then are transmitted to a host 101. In order to display information, the host 101 runs programs and transmits control signals of images to be displayed to the control unit 102 through an input/output interface. The control unit 102 transmits control signals to the driving circuit 106. The control unit 102 comprises, but is not limited to, a timing controller. The driving circuit 106 includes gate drivers and source drivers, but is not limited to gate drivers and source drivers. The signal processing unit 104 comprises a signal amplifier, a frequency circuit and an analog to digital converter, but is not limited, to these devices. The control unit 102 such as a timing controller transmits timing signals sequentially turning on thin film transistor (TFT) switches of the display unit 110 to activate corresponding pixel units of the display unit 110 via the gate drivers and the source drivers according to the control signals. In one embodiment, the thin film transistor switches of the display unit 110 and thin film transistor switches of the sensor coils of the electromagnetic sensor unit 112 share common gate lines. When the pixel units of the display unit 110 are refreshed or scanned by driving the gate drivers and the source drivers of the driving circuit 106 via the control unit 102, the switches of the sensor coils of the electromagnetic sensor unit 112 are also turned on so that the sensor coils of the electromagnetic sensor unit 112 are also scanned while the pixel units of the display unit 110 are refreshed. The signals received by the sensor coils are then transmitted to the signal processing unit 104. The scanning of sensor coils is determined through turning on the thin, film transistor switches by the driving circuit drove via the control unit. While the signals sequentially activate the pixel units, for example each row of the pixel units connecting by a gate line, the signals corresponding to the x coordinates of the indicator are read out through read out lines. The y coordinates of the indicator are obtained through the determination of locations of the gate lines connecting the thin film transistor switches of the electromagnetic sensor units which receive the signals from the indicator. The block scheme of the integrated electromagnetic type input flat panel display apparatus shown in FIG. 1A is one example, not a limitation, and various modifications may be made without departing from the scope of the present invention, which is intended to be limited solely by the appended claims.

Figure 1B:
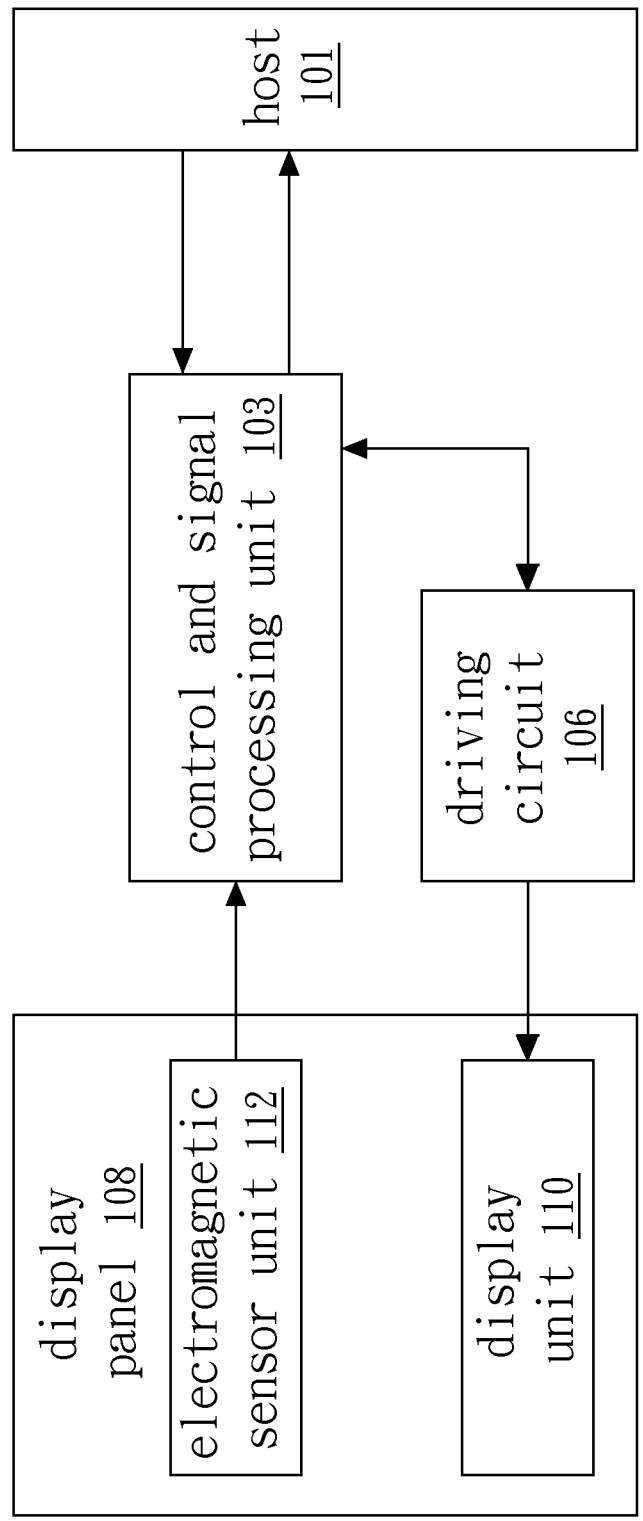
FIG. 1B shows a block diagram of an integrated electromagnetic type input flat panel display apparatus according to another embodiment of the present invention.

FIG. 1B shows a block diagram of an integrated electromagnetic type input flat panel display apparatus according to another embodiment of the present invention. The integrated electromagnetic type input flat panel display apparatus comprises a control and signal processing unit 103, a driving circuit 106, and a display panel 108. The control and signal processing unit 103 comprises a micro-controller unit (MCU), a timing controller, a signal amplifier, a frequency circuit and an analog to digital converter, but is not limited to these devices. The driving circuit 106 includes gate drivers and source drivers, but is not limited to gate drivers and source drivers. When the indicator approaches the display panel 108, the indicator and the sensor coils of the electromagnetic sensor unit 112 interact with each other through signal transmitting and receiving. The signals received by the electromagnetic sensor unit 112 are processed by the control and signal processing unit 103 and then are transmitted to a host 101. The control and signal processing unit 103 transmits timing signals sequentially turning on thin film transistor switches of the display unit 110 to activate corresponding pixel units of the display unit 110 via the gate drivers and the source drivers according to the control signals from the host 101. The gate drivers drive the thin film transistor switches of each row of the display panel 108. When the display panel 108 performs sequential scanning on each row of pixel units, the control and signal processing unit 103 controls the gate drivers of the driving circuit 106 to turn on a row of the thin film transistor switches connecting to a gate line so that the source drivers can input signals to the pixel units. The source drivers input signals to columns of the pixel units of the display panel 108. When the gate driver turns on a row of the thin film transistor switches, the source drivers input signals such as data voltages to the row of the pixel units to provide image pictures on the display apparatus. The thin film transistor switches of the display unit 110 and thin film transistor switches of the sensor coils of the electromagnetic sensor unit 112 share common gate lines. When the pixel units of the display unit 110 are refreshed or scanned by driving the gate drivers and the source drivers of the driving circuit 106 via the control and signal processing unit 103, the switches of the sensor coils of the electromagnetic sensor unit 112 are also turned on so that the sensor coils of the electromagnetic sensor unit 112 are also scanned while the pixel units of the display unit 110 are refreshed. The signals received by the sensor coils are then transmitted to the control and signal processing unit 103. The coordinates of the indicator are calculated by the control and signal processing unit 103 and are transmitted to the host 101. The block scheme of the integrated electromagnetic type input flat panel display apparatus shown in FIG. 1B is one example, not a limitation, and various modifications may be made without departing from the scope of the present invention, which is intended to be limited solely by the appended claims.

The display panel 108 comprises a liquid crystal display (LCD) panel, an organic light emitting display (OLD) panel, and an electronic paper display (EPD) panel, but is not limited to these panels. The display unit 110 and the electromagnetic sensor unit 112 of the display panel 108 are integrated on the display panel 108 through thin film processes. The image pictures displayed by the pixel units of the display unit 110 and the signals transmitting and receiving of the sensor coils of the electromagnetic sensor unit 112 are performed through the control of the thin film transistor switches.

In one embodiment of the invention, the display panel 108 comprises a liquid crystal display panel. The display panel 108 of the integrated electromagnetic type input, flat panel display apparatus includes a thin film transistor array substrate and a color filter substrate. The thin film transistor array substrate and the color filter substrate include transparent substrates, particularly transparent glass substrates. A liquid crystal layer is filled between the thin film transistor array substrate and the color filter substrate. Thin film transistor pixel units are formed on the side of the thin, film transistor array substrate adjacent the liquid crystal layer. Each pixel unit includes a thin film transistor and a transparent conductive metal region of indium tin oxide (ITO). Large number of the pixel units arranged in rows and columns constitute a display area of the display panel. A color filter film is attached on the side of the color filter substrate adjacent the liquid crystal layer. A transparent conductive metal layer of indium tin oxide is formed on the color filter substrate as common electrodes.

Figure 2:
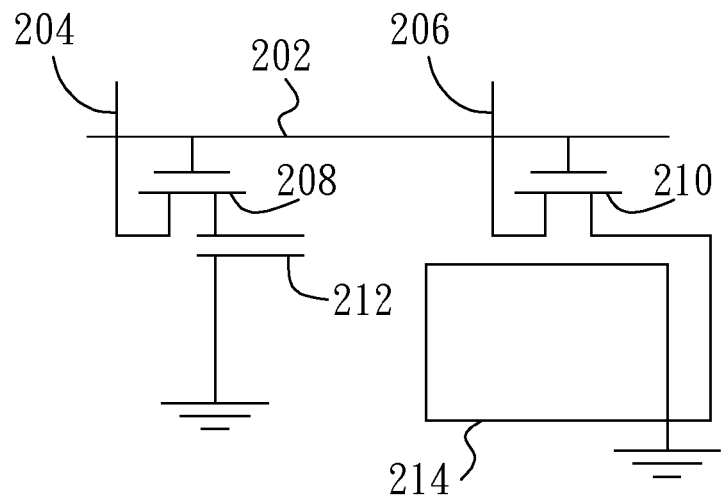
FIG. 2 shows a pixel unit of the display unit and a sensor unit of the electromagnetic sensor unit according to one embodiment of the present invention.

FIG. 2 shows a pixel unit of the display unit and a sensor unit of the electromagnetic sensor unit according to one embodiment of the present invention. The pixel unit of the display unit includes a thin film transistor and a pixel component. If the display panel 108 is a liquid crystal display panel, the pixel unit of the display unit 110 comprises a thin film transistor 208 and a pixel electrode device 212. The pixel component comprises an indium tin oxide pixel electrode device. The gate terminal of the thin film transistor 208 connects to a gate line 202 and is controlled to be turned on/off through the gate line 202. The source of the thin film transistor 208 connects to a source line 204 while the drain connects to the pixel electrode device 212. When the gate driver provides a voltage to the gate line, the gate terminal of the thin film transistor 208 is turned on and the source driver drives the source to provide electrons to the pixel electrode device 212. When the electrons accumulate to a predetermined level, the gate driver stops driving and turns off the thin film transistor 208 to keep the electrons in the pixel electrode device 212. The pixel electrode device 212 and the common electrode comprising indium tin oxide transparent conductive metal constitute a capacitor. When the gate driver provides a voltage to the thin film transistor 208 through the gate line, the pixel electrode device 212 and the common electrode generate an electric field therebetween so as to change the orientation of the liquid crystal between the thin film transistor array substrate and the color filter substrate. A backlight module of the liquid crystal display panel provides a light source and the light from the light source transmits the liquid crystal layer to form a pixel on the display panel. The color filter provides specific colors to each pixel and the combination of every pixel with different colors presents the image pictures shown on the display panel. The sensor unit of the electromagnetic sensor unit 112 includes a thin film transistor 210 and a sensor coil 214. The gate terminal of the thin film transistor 210 also connects to the gate line 202 and is controlled to be turned on/off through the gate line 202. The source of the thin film transistor 210 connects to the sensor coil 214 while the drain connects to a readout line 206. When the gate drivers provide voltages through the gate lines 202 on the thin film transistor array substrate to sequentially turn on the thin film transistors 208 and 210, and an indicator emitting electromagnetic signals approaches the sensor coil 214, a signal of an induction current is generated in the sensor coil 214 and is transmitted to the control and signal processing unit 103 or the signal processing unit 104 through the readout line 206. Since the gate lines 202 and the readout lines 206 are predetermined to be arranged on the thin film transistor array substrate and thus the location of every gate line 202 and every readout line 206 are known, the locations of the sensor coils 214 generating signals of an induction currents can be determined when the indicator approaches the display panel 108. The more precise locations of the indicator on the display panel 108 can be determined through the distribution of the values of the signals of the induction currents. It is noted that the above mentioned embodiment only shows a schematic configuration which only discloses main features of the invention. Other well known minor features are omitted and can be made or used according to related, prior art by one with ordinary skill in the art to carry out the invention.

The indicator comprises active and passive indicators. If a passive indicator or a batteryless digital pen or stylus, the control unit 102 or the control and signal processing unit 103 emit electromagnetic signals through the readout line 206 and the sensor coils 214 to the batteryless digital pen or stylus so that the sensor coils 214 can resonate with the resonance circuit of the batteryless digital pen or stylus. The resonance circuit then transmits electromagnetic signals to the sensor units of the electromagnetic sensor unit 112. The sensor coils 214 corresponding to the location of the batteryless digital pen or stylus receive the electromagnetic signals with maximum values so that the locations of the indicator on the display panel 108 can be determined.

Although the sensor coil 214 shown in FIG. 2 is single loop, the sensor coil 214 is not limited to a single loop. The induced current increases as the number of the sensor coils 214 increases when the indicator approaches. However, for transmissive/transflective liquid crystal display panels, the more the number of the sensor coils, the larger area the sensor coils occupied and the aperture ratio will decrease or the brightness of the display panel will be lower. For non-transmissive liquid crystal display panels, such as organic light emitting display panels and electronic paper display panels, or more precisely reflective electronic paper display panels and self-emissive organic light emitting display panels, there is no issue of the decrease of the aperture ratio or the decrease of the brightness of the display panel. Since the processes of the thin film transistors 210 of the sensor unit, the sensor coil 214 and the readout line 206 can be integrated to the thin film processes of the thin film transistors 208 or other present devices, additional photo mask may be omitted. Since the thin film transistors 208 and 210 connect the gate line 202, the thin film transistors 208 and 210 can be formed on the thin film transistor array substrate together. The sensor coil 214 can be formed in a single layer or a plurality of layers. The readout line 206 can also be formed together with the source line 204. Moreover, the thin film transistor array substrate can also be a flexible substrate. The embodiment of the invention not only can be applied to a transmissive display apparatus, but also can be applied to a transflective display apparatus and a reflective display apparatus.

Figure 3:
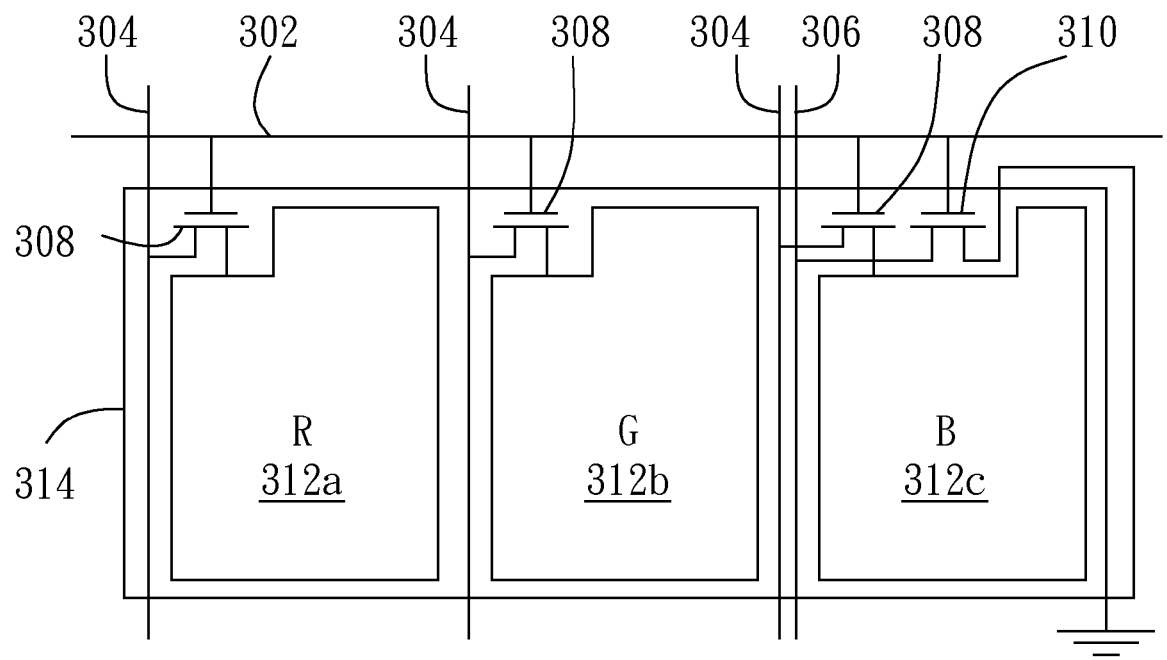
FIG. 3 shows a pixel unit of the display unit and a sensor unit of the electromagnetic sensor unit according to another embodiment of the present invention.

FIG. 3 shows a pixel unit of the display unit and a sensor unit of the electromagnetic sensor unit according to another embodiment of the present invention. The sensor coil shown in FIG. 3 is around three pixels or subpixels different to the sensor coil shown in FIG. 2. As shown in FIG. 3, each of red pixel unit, green pixel unit and blue pixel unit of the display unit 110 include a thin film transistor 308 and pixel electrode devices 312a, 312b and 312c respectively. The gate terminals of the thin film transistors 308 connect to a gate line 302 and is controlled, to be turned on/off through the gate line 302. The sources of the thin film transistors 308 connect to source lines 304 respectively while the drains connect to pixel electrode devices 312a, 312b and 312c respectively. The sensor unit of the electromagnetic sensor unit 112 includes a thin film transistor 310 and a sensor coil 314. The thin film transistor 310 is located at the blue pixel unit. The gate terminal of the thin film transistor 310 also connects to the gate line 302 and is controlled to be turned on/off through the gate line 302. The source of the thin film transistor 310 connects to the sensor coil 314 while the drain connects to a readout line 306. The sensor coil 314 is around the red, green and blue pixel units. For transmissive liquid crystal display panels, the sensor coil 314 in FIG. 3 occupies less area comparing to the sensor coil 214 in FIG. 2 so that the issue of the decrease of brightness of the transmissive liquid crystal display panel resulting from the decrease of the aperture ratio can be reduced.

Figure 4:
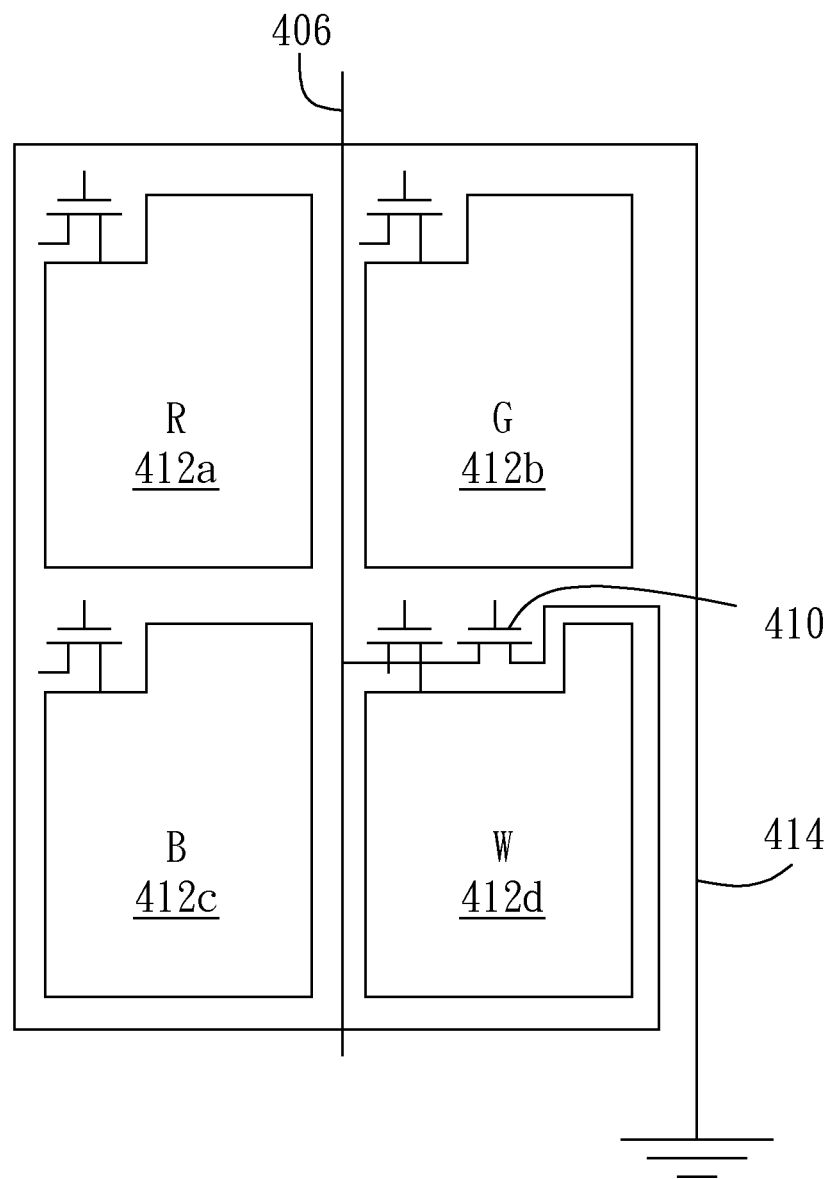
FIG. 4 shows a pixel unit of the display unit and a sensor unit of the electromagnetic sensor unit according to another embodiment of the present invention.

FIG. 4 shows a pixel unit of the display unit and a sensor unit of the electromagnetic sensor unit according to another embodiment of the present invention. As shown in FIG. 4, each of red pixel unit, green pixel unit, blue pixel unit and white pixel unit of the display unit 110 include a thin film transistor and pixel electrode devices 412a, 412b, 412c and 412d respectively. The sensor unit of the electromagnetic sensor unit 112 includes a thin film transistor 410 and a sensor coil 414. The gate terminal of the thin film transistor 410 also connects to a gate line (not shown) and is controlled to be turned on/off through the gate line. The source of the thin film transistor 410 connects to the sensor coil 414 while the drain connects to a readout line 406. For transmissive liquid crystal display panels, the thin film transistor 410 is located at the white pixel unit (or blue pixel unit) and the sensor coil 414 is around the red, green, blue and white pixel units so that the degree of the decrease of brightness of the transmissive liquid crystal display panel resulting from the decrease of the aperture ratio can be reduced. The embodiments of the pixel unit and the sensor unit mentioned above are just examples, not limitations, and various modifications may be made without departing from the scope of the present invention, which is intended to be limited solely by the appended claims.

The invention provides an integrated electromagnetic type input flat panel display apparatus without additional printed circuit board with sensor coils or antennas to decrease the weight and cost of the display apparatus and to prevent the problems of alignment between the display panel and the printed circuit board with sensor coils or antennas. Through integrating the thin film transistors and the sensor coils for touch control into the pixel array of the display panel, the weight and cost of the display apparatus can be decreased and the problems of alignment between the display panel and the printed circuit board with sensor coils or antennas can be solved.

Although specific embodiments have been illustrated and described, it will be appreciated by those skilled in the art that various modifications may be made without departing from the scope of the present invention, which is intended to be limited solely by the appended claims.

What is claimed is:

1. An integrated electromagnetic type input flat panel display apparatus, comprising:
   a display panel, the display panel comprising:
      a display unit having a plurality of pixel units, each pixel unit including a first thin film transistor and a pixel component, a gate terminal of the first thin film transistor connecting to a gate line, a source of the first thin film transistor connecting to a source line, and a drain of the first thin film transistor connecting to the pixel component;
      an electromagnetic sensor unit including a plurality of sensor units, each sensor unit having a second thin film transistor and a sensor coil, a gate terminal of the second thin film transistor connecting to the gate line whereby the gate terminals of the first and second thin film transistors are connected to the same gate line, a source of the second thin film transistor connecting to the sensor coil, and a drain of the second thin film transistor connecting to a readout line; and
   a signal processing unit for receiving and processing signals from the electromagnetic sensor unit.

2. The display apparatus according to claim 1, wherein the display panel comprises a liquid crystal display panel, an organic light emitting display panel, and an electronic paper display panel.

3. The display apparatus according to claim 1, wherein the pixel component comprises a pixel electrode device having an indium tin oxide transparent conductive metal.

4. The display apparatus according to claim 1, wherein each sensor unit is arranged with each pixel unit.

5. The display apparatus according to claim 1, wherein each sensor unit is arranged with each blue pixel unit.

6. The display apparatus according to claim 1, wherein each sensor coil is around red, green, and blue pixel units of the pixel units.

7. The display apparatus according to claim 1, wherein each sensor unit is arranged with each white pixel unit.

8. The display apparatus according to claim 1, wherein each sensor coil is around red, green, blue and white pixel units of the pixel units.

9. The display apparatus according to claim 1, wherein the display panel includes a thin film transistor array substrate, the display unit and the electromagnetic sensor unit are on the thin film transistor array substrate.

10. The display apparatus according to claim 9, wherein the thin film transistor array substrate comprises a flexible substrate.

11. An integrated electromagnetic type input thin film transistor array substrate, comprising:
   a transparent substrate;
   a plurality of pixel units on the transparent substrate, each pixel unit including a first thin film transistor and a pixel component, a gate terminal of the first thin film transistor connecting to a gate line, a source of the first thin film transistor connecting to a source line, and a drain of the first thin, film transistor connecting to the pixel component; and
   a plurality of sensor units on the transparent substrate, each sensor unit having a second thin film transistor and a sensor coil, a gate terminal of the second thin film transistor connecting to the gate line whereby the gate terminals of the first and second thin film transistors are connected to the same gate line, a source of the second thin film transistor connecting to the sensor coil, and a drain of the second thin film transistor connecting to a readout line;
   wherein the gate line connects a gate driver, and the source line connects to a source driver.

12. The thin film transistor array substrate according to claim 11, wherein the transparent substrate comprises a transparent glass substrate.

13. The thin film transistor array substrate according to claim 11, wherein the thin film transistor array substrate comprises thin film transistor array substrates of a transmissive display apparatus, a transflective display apparatus and a reflective display apparatus.

14. The thin film transistor array substrate according to claim 11, wherein the thin film transistor array substrate comprises a thin film transistor array substrate of an electronic paper display panel.

15. The thin film transistor array substrate according to claim 11, wherein each sensor unit is arranged with each blue pixel unit.

16. The thin film transistor array substrate according to claim 15, wherein each sensor coil is around red, green, and blue pixel units of the pixel units.

17. The thin film transistor array substrate according to claim 11, wherein each sensor unit is arranged with each white pixel unit.

18. The thin film transistor array substrate according to claim 17, wherein each sensor coil is around red, green, blue and white pixel units of the pixel units.

* * * * *